US006383684B1

(12) United States Patent
Yoshimura et al.

(10) Patent No.: US 6,383,684 B1
(45) Date of Patent: *May 7, 2002

(54) LITHIUM SECONDARY BATTERY COMPRISING TUNGSTEN-CONTAINING OXIDE OF MONOCLINIC CRYSTAL STRUCTURE

(75) Inventors: Seiji Yoshimura, Hirakata; Masahisa Fujimoto, Osaka; Shin Fujitani, Hirakata, all of (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/533,668

(22) Filed: Mar. 23, 2000

(30) Foreign Application Priority Data

Mar. 25, 1999 (JP) .......................................... 11-080761

(51) Int. Cl.[7] ................................................. H01M 4/58
(52) U.S. Cl. ................................. 429/231.1; 429/231.5; 429/218.1
(58) Field of Search ........................... 429/231.1, 231.5, 429/218.1

(56) References Cited

FOREIGN PATENT DOCUMENTS

JP          8-241707          9/1996

OTHER PUBLICATIONS

CRC Handbook of Chemistry and Physics—74th Edition, 1993, p. 4–109.
Journal of Power Sources 54 (1995) pp. 461–464.
Binary Alloy Phase Diagrams—vol. 2—American Society for Metals pp. 1797 and 1798.

*Primary Examiner*—Carol Chaney
*Assistant Examiner*—Dah-Wei Yuan
(74) *Attorney, Agent, or Firm*—Armstrong, Westerman & Hattori, LLP

(57) ABSTRACT

In a lithium secondary battery provided with a positive electrode, a negative electrode, and a non-aqueous electrolyte, a composite oxide represented by a chemical formula $M_X W_{1-X} O_Y$ (wherein M denotes at least one type of metal element selected from the group consisting of Cu, V, Cr, Mn, Fe, Co, and Ni; and the conditions of $0 < X < 0.46$ and $2.5 \leq Y \leq 3.5$ are satisfied) and having a monoclinic crystal structure or the composite oxide to which lithium is added is used as a positive electrode active material for said positive electrode or a negative electrode active material for said negative electrode.

19 Claims, 2 Drawing Sheets

LITHIUM SECONDARY BATTERY COMPRISING TUNGSTEN-CONTAINING OXIDE OF MONOCLINIC CRYSTAL STRUCTURE

BACKGROUND OF THE INVENTION

1. Field of the Invention

The present invention relates generally to a lithium secondary battery provided with a positive electrode, a negative electrode, and a non-aqueous electrolyte, and more particularly, to a lithium secondary battery whose charge/discharge cycle performance is improved upon improvement of a positive electrode active material used for its positive electrode or a negative electrode active material used for its negative electrode.

2. Description of the Related Art

In recent years, secondary batteries have begun to be used in various fields such as electronic equipment and the like. Lithium secondary batteries are attracting great attention as one of new-type batteries having high power and high energy density, and various efforts have been made to develop such lithium secondary batteries.

In order to improve charge/discharge cycle performance of such lithium secondary batteries, one so adapted as to employ as a negative electrode active material an oxide such as tungsten trioxide which is previously lithiumized has been proposed, as disclosed in Japanese Patent Laid-Open No. Hei8(1996)-241707.

Unfortunately, however, the above-mentioned tungsten trioxide has an unstable crystal structure, as described in the literature (J. Guo, Y. J. Li and M. S. Whittingham, J. Power. Sources., 54, 461, 1995). When the tungsten trioxide is used as a negative electrode active material in a lithium secondary battery, the tungsten trioxide is degraded in capacity of occluding and discharging lithium due to the transformation of its crystal structure. Accordingly, there still exist a problem that the battery cannot attain an adequate improvement in charge/discharge cycle performance.

SUMMARY OF THE INVENTION

An object of the present invention is to improve charge/discharge cycle performance of a lithium secondary battery provided with a positive electrode, a negative electrode, and a non-aqueous electrolyte upon improvement of a positive electrode active material used for said positive electrode or a negative electrode active material used for said negative electrode.

A lithium secondary battery according to the present invention is a lithium secondary battery provided with a positive electrode, a negative electrode, and a non-aqueous electrolyte, wherein a composite oxide represented by a chemical formula $M_XW_{1-X}O_Y$ (wherein M denotes at least one type of metal element selected from the group consisting of Cu, V, Cr, Mn, Fe, Co, and Ni; and the conditions of $0<X<0.46$ and $2.5 \leq Y \leq 3.5$ are satisfied) and having a monoclinic crystal structure or the composite oxide to which lithium is added is used as a positive electrode active material for said positive electrode or a negative electrode active material for said negative electrode.

The literature (Binary Alloy Phase Diagrams, (1986), American Society for Metals: M-O binary phase diagram) shows that the metal element M, which is selected from the group consisting of Cu, V, Cr, Mn, Fe, Co, and Ni, in the composite oxide represented by the foregoing chemical formula forms a stable compound whose decomposition temperature is more than 1000° C. in combination with an oxygen atom O.

When the metal element M is added to tungsten trioxide to obtain a composite oxide represented by the foregoing chemical formula, the composite oxide has a monoclinic crystal structure similar to that of the tungsten trioxide. In addition, the metal elements M are incorporated in some of crystal lattices of the tungsten dioxide to attain a relatively strong chemical bond with oxygen atoms O, thereby stabilizing the crystal structure of the composite oxide.

Accordingly, when the composite oxide represented by the foregoing chemical formula is used as a positive electrode active material or a negative electrode active material in a lithium secondary battery, the composite oxide is prevented from being degraded in capacity of occluding and discharging lithium due to the transformation of its crystal structure. The lithium secondary battery excellent in charge/discharge cycle performance thus can be obtained.

Further, a lithium secondary battery employing a composite oxide represented by a chemical formula $M_XW_{1-X}O_Y$ (wherein M denotes at least one type of metal element selected from the group consisting of Cu, V, Cr, Mn, Fe, Co, and Ni; and the conditions of $0.02 \leq X \leq 0.45$ and $2.5 \leq Y \leq 3.5$ are satisfied) and having a monoclinic crystal structure as a positive electrode active material or a negative electrode active material can attain more excellent charge/discharge cycle performance because the crystal structure of the composite oxide is further stabilized.

When other element such as Cd, La, Ce, Sm, or Mo, which forms highly stable compound in combination with an oxygen atom O as described above, is used as the metal element M in the above-mentioned composite oxide, the resultant composite oxide is still expected to be effective in improving charge/discharge cycle performance of a lithium secondary battery.

When the composite oxide represented by the foregoing chemical formula is used as a positive electrode active material in the lithium secondary battery of the present invention, various materials generally used in lithium secondary batteries may be used as a negative electrode active material. Examples of a usable material include carbon materials capable of electrochemically occluding and discharging lithium, such as natural graphite, artificial graphite, coke, and calcined products of organic substances; lithium alloys such as an Li—Al alloy, an Li—Mg alloy, an Li—In alloy, and an Li—Al—Mn alloy; and lithium metals. However, when the Li alloys or Li metals is used as the negative electrode active material, branch-like dendrite crystals grow during the charging and discharging of the battery so that a short circuit may occur in the battery. Therefore, it is preferable to use the carbon materials as the negative electrode active material.

On the other hand, when the composite oxide represented by the foregoing chemical formula is used as a negative electrode active material in the lithium secondary battery of the present invention, various materials generally used in lithium secondary batteries may be used as a positive electrode active material. When a lithium-containing transition metal oxide such as $LiCoO_2$, $LiNiO_2$, $LiMn_2O_4$, $LiMnO_2$, $LiCo_{0.5}Ni_{0.5}O_2$, $LiNi_{0.7}CO_{0.2}Mn_{0.1}O_2$, $LiCo_{0.9}Ti_{0.1}O_2$, or $LiCo_{0.5}Ni_{0.4}Zr_{0.1}O_2$ is used as the positive electrode active material, the lithium secondary battery with a charge voltage of approximately 1.9 V and a discharge voltage of approximately 1.1 V is obtained.

Then, a case where the composite oxide represented by the foregoing chemical formula is used as the positive electrode active material and a case where the composite oxide represented by the foregoing chemical formula is used as the negative electrode active material are compared with each other. As a result, it was found that the lithium secondary battery employing the composite oxide as the positive electrode active material requires higher charging voltage, whereby the non-aqueous electrolyte solution is liable to be decomposed. Accordingly, it is preferable to use the composite oxide represented by the forgoing chemical formula as the negative electrode active material.

Further, in the lithium secondary battery according to the present invention, the above-mentioned composite oxide represented by the forgoing chemical formula can be synthesized by calcining each element to compose the composite oxide, a compound containing the element, and the mixture of these.

When they are calcined at temperatures of less than 400° C., the above-mentioned metal element M may not be sufficiently dispersed in crystal lattices of tungsten trioxide. On the other hand, when they are calcined at high temperatures of more than 1400° C., calcined products melt, resulting in uneven composition of the composite oxide when they are cooled down to room temperature, as shown in W-O binary phase diagram in the above-mentioned reference (Binary Alloy Phase Diagrams, Vol.2, p1798 (1986), American Society for Metals). Accordingly, when the lithium secondary battery employs as the positive electrode active material or the negative electrode active material the composite oxide calcined at temperatures of less than 400° C. or more than 1400° C., it is difficult to sufficiently improved the charge/discharge cycle performance of the battery. Therefore, the composite oxide represented by the foregoing chemical formula is preferably obtained by being calcined at temperatures of not less than 400° C. and not more than 1400° C., and more preferably not less than 600° C. and not more than 1200° C.

The lithium secondary battery according to the present invention is characterized in that the composite oxide represented by the foregoing chemical formula is used as a positive electrode active material or a negative electrode active material. It is to be noted that a non-aqueous electrolyte used in the lithium secondary battery is not particularly limited and any known non-aqueous electrolytes generally utilized may be employed.

As such a non-aqueous electrolyte, a non-aqueous electrolyte solution obtained by dissolving a solute in an organic solvent or a solid electrolyte may be used.

Examples of an organic solvent to be used in the non-aqueous electrolyte solution include cyclic carbonic esters such as ethylene carbonate, propylene carbonate, vinylene carbonate, and butylene carbonate; chain carbonic esters such as dimethyl carbonate, diethyl carbonate, and methyl ethyl carbonate; sulfolane; tetrahydrofuran; 1,3-dioxolane; 1,2-diethoxyethane; 1,2-dimethoxyethane; ethoxymethoxyethane; and the like. These solvents may be used alone or in combination of two or more types.

Further, examples of a solute to be dissolved in the above-mentioned organic solvent include lithium compounds such as $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, and $LiC(C_2F_5SO_2)_3$.

Furthermore, examples of a usable solid electrolyte include a polymer electrolyte comprising a polymer such as polyethylene oxide or polyacrylonitrile containing the above-mentioned solute therein, a gelled polymer electrolyte comprising the above-mentioned polymer impregnated with the above-mentioned non-aqueous electrolyte solution, and an inorganic solid electrolyte such as LiI and $Li_3N$.

These and other objects, advantages and features of the invention will become apparent from the following description thereof taken in conjunction with the accompanying drawings which illustrate specific embodiment of the invention.

DESCRIPTION OF THE PREFERRED EMBODIMENTS

The following examples specifically illustrate lithium secondary batteries according to the present invention. Further, comparative examples will be taken to make it clear that the lithium secondary batteries of the examples are improved in charge/discharge cycle performance upon improvement of stability of positive electrode active materials or negative electrode active materials. It should be appreciated that the lithium secondary batteries according to the present invention are not particularly limited to those in the following examples, and various changes and modifications may be made in the invention without departing from the spirit and scope thereof.

EXAMPLE 1

Figure 1:
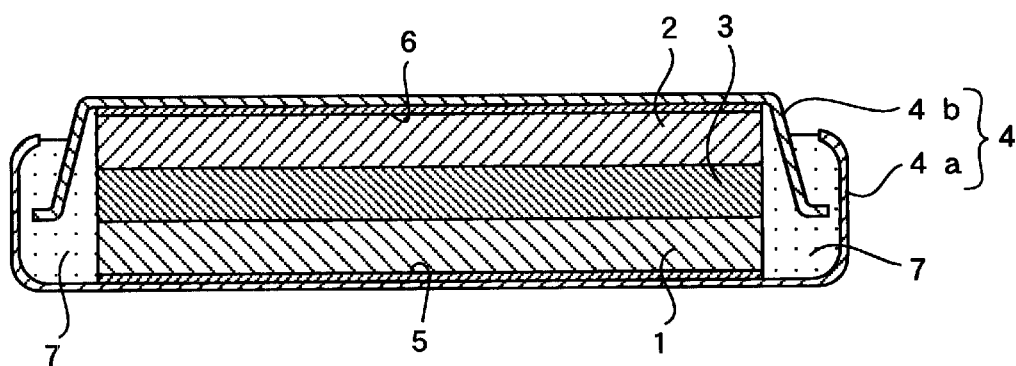
FIG. 1 is a sectional illustration showing the internal construction of each of the lithium secondary batteries fabricated in examples and comparative examples of the present invention.

In the present example, a positive electrode and a negative electrode were fabricated in the following manner, and a non-aqueous electrolyte solution was prepared in the following manner, to fabricate a flat-type lithium secondary battery as shown in FIG. 1.

(Fabrication of Positive Electrode)

In fabricating a positive electrode, reagents of $CuCo_3$, W, and $WO_3$ respectively having purity of 99.9% or more were used, and they were scaled so that atomic ratio between Cu, W, and O (Cu:W:O) would be 0.2:0.8:3. Subsequently, these reagents were mixed together in a mortar, after which the resultant mixture was subjected to press-molding at a pressure of 115 kg/cm² using a die having a diameter of 17 mm. The mixture thus molded was then calcined for 10 hours at 1000° C. in an atmosphere of mixed gas comprising oxygen and nitrogen in a volume ratio of 2:3, to obtain a calcined product of $Cu_{0.2}W_{0.8}O_3$. Subsequently, the calcined product of $Cu_{0.2}W_{0.8}O_3$ was crushed in a mortar to obtain $Cu_{0.2}W_{0.8}O_3$ powder having an average particle diameter of 10 μm. The powder thus obtained was used as a positive electrode active material. When the $Cu_{0.2}W_{0.8}O_3$ powder was analyzed by an X-ray diffraction method, it was found that the powder had a monoclinic crystal structure similar to that of tungsten trioxide.

Then, the $Cu_{0.2}W_{0.8}O_3$ powder, carbon powder as a conductive agent, and polyvinylidene fluoride powder as a binding agent were mixed in a weight ratio of 85:10:5. N-methyl-2-pyrolidone solution was further added to the resultant mixture, and the mixture was brought into a slurry. Next, the slurry was applied to one side of an aluminum foil having a thickness of 20 μm as a positive electrode current collector by means of the doctor blade coating method. The slurry on the positive-electrode current collector was dried at 150° C. and was then punched out to obtain a disk-like positive electrode having a diameter of 17 mm and a thickness of 1.0 mm.

Subsequently, lithium hexafluorophosphate $LiPF_6$ was dissolved in a concentration of 1 mol/l in a mixed solvent containing ethylene carbonate and diethyl carbonate in the volume ratio of 1:1 to prepare an electrolyte solution. A microporous film made of polypropylene was interposed between the positive electrode fabricated in the above-mentioned manner and a lithium metal in the electrolyte solution. In this state, the lithium metal was electrolyzed with constant current of 100 μA up to 1.6 V (vs. $Li/Li^+$), so that lithium is intercalated in the positive electrode.

(Fabrication of Negative Electrode)

In fabricating a negative electrode, natural graphite powder was used as a negative electrode active material. The natural graphite powder and polyvinylidene fluoride as a binding agent were mixed in a weight ratio of 95:5. N-methyl-2-pyrolidone solution was added to the resultant mixture, and the mixture was brought into a slurry. Next, the slurry was applied to one side of a copper foil having a thickness of 20 μm as a negative-electrode current collector by means of the doctor blade coating method. Subsequently, the slurry on the negative-electrode current collector was dried at 150° C. and was then punched out to obtain a disk-like negative electrode having a diameter of 17 mm and a thickness of 1.0 mm.

(Preparation of Non-aqueous Electrolyte Solution)

In preparing a non-aqueous electrolyte solution, a mixed solvent containing ethylene carbonate and diethyl carbonate in a volume ratio of 1:1 was used. Lithium hexafluorophosphate $LiPF_6$ was dissolved as a solute in the mixed solvent in a concentration of 1 mol/l to prepare a non-aqueous electrolyte solution.

(Fabrication of Battery)

In fabricating a lithium secondary battery, as shown in FIG. 1, a microporous film made of polypropylene and impregnated with the above-mentioned non-aqueous electrolyte solution was interposed as a separator 3 between the positive electrode 1 and the negative electrode 2 respectively fabricated in the above-mentioned manners, after which they were contained in a battery case 4 comprising a positive-electrode can 4a and a negative-electrode can 4b, and the positive electrode 1 was connected to the positive-electrode can 4a via the positive-electrode current collector 5 while the negative electrode 2 was connected to the negative-electrode can 4b via the negative-electrode current collector 6, to electrically separate the positive-electrode can 4a and the negative-electrode can 4b from each other by an insulating packing 7.

EXAMPLES 2 to 7

In the examples 2 to 7, lithium secondary batteries were fabricated in the same manner as that in the above-mentioned example 1 except that only the type of the positive electrode active material was changed in the fabrication of the positive electrode in the example 1. More specifically, there were used as positive electrode active materials $V_{0.2}W_{0.8}O_3$ powder in the example 2; $Cr_{0.2}W_{0.8}O_3$ powder in the example 3; $Mn_{0.2}W_{0.8}O_3$ powder in the example 4; $Fe_{0.2}W_{0.8}O_3$ powder in the example 5; $Co_{0.2}W_{0.8}O_3$ powder in the example 6; and $Ni_{0.2}W_{0.8}O_3$ powder in the example 7, as shown in the following Table 1. When the above-mentioned each powder was analyzed by an X-ray diffraction method, it was found that the powder had a monoclinic crystal structure similar to that of tungsten trioxide, similarly to the above-mentioned $Cu_{0.2}W_{0.8}O_3$ powder.

COMPARATIVE EXAMPLE 1

In the comparative example 1, a lithium secondary battery was fabricated in the same manner as that in the above-mentioned example 1 except that only the type of the positive electrode active material was changed in the fabrication of the positive electrode in the example 1. More specifically, the comparative example 1 employed as a positive electrode active material $WO_3$ as shown in the following Table 1.

Next, each of the lithium secondary batteries in the examples 1 to 7 and the comparative example 1 fabricated as above was charged with constant current of 100 μA to a charge cut-off voltage of 2.4 V and was then discharged with constant current of 100 μA to a discharge cut-off voltage of 1.2 V at a temperature of 25° C. The above-mentioned charging and discharging were considered as one cycle. 50 cycles of charging and discharging were performed to measure discharging capacities at the first cycle time and the 50th cycle time. The ratio of the discharging capacity Q50 at the 50th cycle time to the discharging capacity Q1 at the first cycle time [(Q50/Q1)×100] was found as the percentage of capacity retention (%). The results were also shown in the following Table 1. In each of the lithium secondary batteries according to the examples 1 to 7 and the comparative example 1, an average discharge voltage determined by dividing an integral value of the voltage up to the discharge cut-off voltage by the time period was approximately 1.6 V.

TABLE 1

| | positive electrode active material | negative electrode active material | percentage of capacity retention (%) |
|---|---|---|---|
| example 1 | $Cu_{0.2}W_{0.8}O_3$ | graphite | 91 |
| example 2 | $V_{0.2}W_{0.8}O_3$ | graphite | 85 |
| example 3 | $Cr_{0.2}W_{0.8}O_3$ | graphite | 90 |
| example 4 | $Mn_{0.2}W_{0.8}O_3$ | graphite | 90 |
| example 5 | $Fe_{0.2}W_{0.8}O_3$ | graphite | 88 |
| example 6 | $Co_{0.2}W_{0.8}O_3$ | qraphite | 90 |
| example 7 | $Ni_{0.2}W_{0.8}O_3$ | graphite | 87 |
| comparative example 1 | $WO_3$ | graphite | 50 |

As apparent from the result, the lithium secondary batteries in the examples 1 to 7 employing as the positive electrode active materials $M_{0.2}W_{0.8}O_3$ (wherein M denotes Cu, V, Cr, Mn, Fe, Co, and Ni, respectively) presented far much higher percentage of capacity retention and were remarkably improved in charge/discharge cycle performance as compared with the lithium secondary battery in the comparative example 1 employing $WO_3$ as the positive electrode active material.

EXAMPLES 8 TO 13 AND COMPARATIVE EXAMPLE 2

In the examples 8 to 13 and the comparative example 2, lithium secondary batteries were fabricated in the same manner as that in the above-mentioned example 1 except that a molar ratio between Cu and W in the composite oxide of Cu and W, which is represented by $Cu_xW_{1-x}O_y$, as the positive electrode active material was changed in the fabrication of the positive electrode in the example 1. More specifically, there were used as the positive electrode active materials $Cu_{0.02}W_{0.98}O_3$ in the example 8; $Cu_{0.05}W_{0.95}O_3$ in the example 9; $Cu_{0.1}W_{0.9}O_3$ in the example 10; $Cu_{0.3}W_{0.7}O_3$ in the example 11; $Co_{0.4}W_{0.6}O_3$ in the example 12; and $Cu_{0.45}W_{0.55}O_3$ in the example 13, and further, $Cu_{0.47}W_{0.53}O_3$ in the comparative example 2, as shown in the following Table 2.

Figure 2:
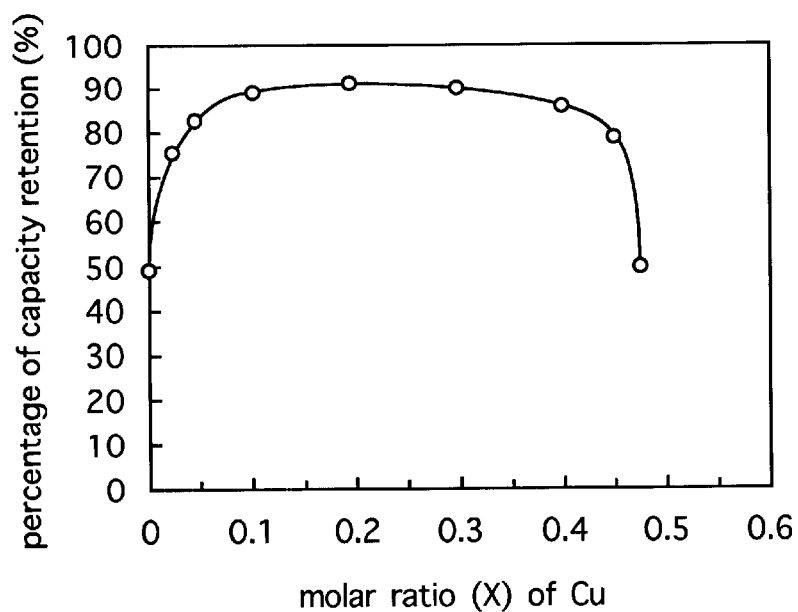
FIG. 2 is a diagram showing the relationship between a molar ratio (X) of Cu in $Cu_xW_{1-x}O_3$ as a positive electrode active material and a percentage of capacity retention of the obtained lithium secondary battery.

With respect to each of the lithium secondary batteries according to the examples 8 to 13 and the comparative example 2, the discharge capacities at the first cycle time and at the 50th cycle time were measured in the same manner as that in the above-mentioned examples 1 to 7, to find the percentage of capacity retention (%). The results, along with that of the above-mentioned example 1, are shown in the following Table 2 and FIG. 2. Further, in each of the lithium secondary batteries according to the examples 8 to 13 and the comparative example 2, an average discharge voltage determined by dividing an integral value of the voltage up to the discharge cut-off voltage by the time period was also approximately 1.6 V.

TABLE 2

|  | positive electrode active material | negative electrode active material | percentage of capacity retention (%) |
| --- | --- | --- | --- |
| example 8 | $Cu_{0.02}W_{0.98}O_3$ | graphite | 75 |
| example 9 | $Cu_{0.05}W_{0.95}O_3$ | graphite | 83 |
| example 10 | $Cu_{0.1}W_{0.9}O_3$ | graphite | 87 |
| example 1 | $Cu_{0.2}W_{0.8}O_3$ | graphite | 91 |
| example 11 | $Cu_{0.3}W_{0.7}O_3$ | graphite | 89 |
| example 12 | $Cu_{0.4}W_{0.6}O_3$ | graphite | 85 |
| example 13 | $Cu_{0.45}W_{0.55}O_3$ | graphite | 78 |
| comparative example 2 | $Cu_{0.47}W_{0.53}O_3$ | graphite | 50 |

As apparent from the result, the lithium secondary batteries in the examples 1 and 8 to 13 each employing as the positive electrode active material the composite oxide of Cu and W wherein the molar ratio (X) of Cu is not more than 0.45 presented the increased percentage of capacity retention and were improved in charge/discharge cycle performance as compared with the lithium secondary battery in the comparative example 2 employing as the positive electrode active material the composite oxide of Cu and W wherein the molar ratio (X) of Cu is 0.47. Particularly, the lithium secondary batteries in the examples 1 and 9 to 12 each employing as the positive electrode active material the composite oxide of Cu and W wherein the molar ratio (X) of Cu is in the range of 0.05 to 0.4 presented the further increased percentage of capacity retention and were remarkably improved in charge/discharge cycle performance.

Although the present examples and comparative example cited the composite oxide of Cu and W, substantially the same results may be attained by the composite oxide of W and one element selected from the group consisting of V, Cr, Mn, Fe, Co, and Ni.

EXAMPLES 14 AND 15

In each of the examples 14 and 15, $Cu_{0.2}W_{0.8}O_3$ was used as a positive electrode active material to fabricate a positive electrode as in the above-mentioned example 1, and Li was not intercalated in the positive electrode.

Further, the example 14 employed a negative electrode obtained by punching a sheet of a lithium metal (Li metal) in a disk-like shape with a diameter of 17 mm and a thickness of 1.0 mm in an argon atmosphere. On the other hand, the example 15 employed a negative electrode obtained by punching a sheet of an Li—Al alloy containing Li in 20.6 wt % in a disk-like shape with a diameter of 17 mm and a thickness of 1.0 mm in an argon atmosphere.

Except for the above, the same procedure as that in the above-mentioned example 1 was taken to fabricate each lithium secondary battery in the examples 14 and 15.

Each of the lithium secondary batteries in the examples 14 and 15 fabricated as above was discharged with constant current of 100 $\mu A$ to 1.2 V at a temperature of 25° C. Subsequently, each of the batteries was charged with constant current of 100 $\mu A$ to a charge cut-off voltage of 2.4 V and was then discharged with constant current of 100 $\mu A$ to a discharge cut-off voltage of 1.2 V. The above-mentioned charging and discharging were considered as one cycle. 50 cycles of charging and discharging were performed to measure discharging capacities at the first cycle time and the 50th cycle time. The ratio of the discharging capacity Q50 at the 50th cycle time to the discharging capacity Q1 at the first cycle time [(Q50/Q1)×100] was found as the percentage of capacity retention (%). The results were also shown in the following Table 3. An average discharge voltage determined by dividing an integral value of the voltage up to the discharge cut-off voltage by the time period was approximately 1.6 V in the lithium secondary battery according to the example 14 while approximately 1.4 V in the lithium secondary battery according to the example 15.

TABLE 3

|  | positive electrode active material | negative electrode active material | percentage of capacity retention (%) |
| --- | --- | --- | --- |
| example 14 | $CU_{0.2}W_{0.8}O_3$ | Li metai | 70 |
| example 15 | $Cu_{0.2}W_{0.8}O_3$ | Li-Al alloy | 73 |

As apparent from the result, even when the Li metal or Li—Al alloy was used as the negative electrode active material, the lithium secondary batteries in the examples 14 and 15 each employing as the positive electrode active material $Cu_{0.2}W_{0.8}O_3$ presented the increased percentage of capacity retention and were improved in charge/discharge cycle performance as compared with the lithium secondary batteries in the comparative examples 1 and 2.

Further, when the lithium secondary batteries in the examples 14 and 15 were compared with the lithium secondary battery in the above-mentioned example 1 employing the same positive electrode active material $Cu_{0.2}W_{0.8}O_3$, it was found that the lithium secondary battery in the above-mentioned example 1 employing the natural graphite powder as the negative electrode active material presented the further increased percentage of capacity retention. The reason for this is conceivably that when the carbon material such as natural graphite powder was used as the negative electrode active material, the possibility that branch-like dendrite crystals grow due to the charging and discharging of the battery so that a short circuit may occur in the battery as in the case where the Li metal or Li alloy are used as a negative electrode active material was deleted.

EXAMPLES 16 TO 20 AND COMPARATIVE EXAMPLES 3 TO 5

In the examples 16 to 20 and the comparative example 3 to 5, lithium secondary batteries were fabricated in the same manner as that in the above-mentioned example 1 except that a molar ratio (Y) of oxygen atom O contained in the composite oxide of Cu and W, which is represented by $Cu_{0.2}W_{0.8}O_Y$, as the positive electrode active material was changed in the fabrication of the positive electrode in the example 1. More specifically, there were used as the positive electrode active materials $Cu_{0.2}W_{0.8}O_{2.5}$ in the example 16; $Cu_{0.2}W_{0.8}O_{2.6}$ in the example 17; $Cu_{0.2}W_{0.8}O_{2.8}$ in the example 18; $Cu_{0.2}W_{0.8}O_{3.2}$ in the example 19; $Cu_{0.2}W_{0.8}O_{3.5}$ in the example 20, and further, $Cu_{0.2}W_{0.8}O_{2.3}$ in the comparative example 3; $Cu_{0.2}W_{0.8}O_{2.4}$ in the comparative example 4; and $Cu_{0.2}W_{0.8}O_{3.6}$ in the comparative example 5, as shown in the following Table 4.

Figure 3:
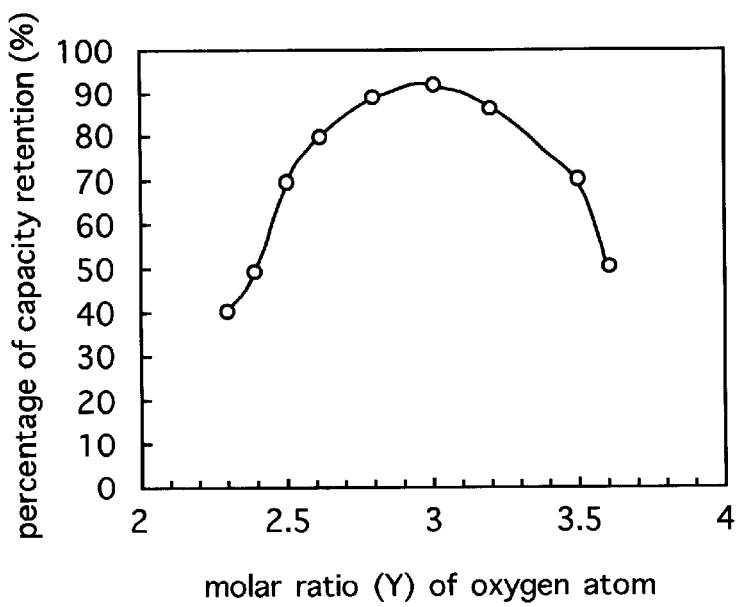
FIG. 3 is a diagram showing the relationship between a molar ratio (Y) of oxygen in $Cu_{0.2}W_{0.8}O_Y$ as a positive electrode active material and a percentage of capacity. retention of the obtained lithium secondary battery.

With respect to each of the lithium secondary batteries according to the examples 16 to 20 and the comparative examples 3 to 5, the discharge capacities at the first cycle time and at the 50th cycle time were measured in the same manner as that in the above-mentioned examples 1 to 7, to find the percentage of capacity retention (%). The results, along with that of the above-mentioned example 1, are shown in the following Table 4 and FIG. 3. Further, in each of the lithium secondary batteries according to the examples 16 to 20 and the comparative examples 3 to 5, an average discharge voltage determined by dividing an integral value of the voltage up to the discharge cut-off voltage by the time period was also approximately 1.6 V.

TABLE 4

| | positive electrode active material | negative electrode active material | percentage of capacity retention (%) |
|---|---|---|---|
| comparative example 3 | $CU_{0.2}W_{0.8}O_{2.3}$ | graphite | 40 |
| comparative example 4 | $CU_{0.2}W_{0.8}O_{2.4}$ | graphite | 50 |
| example 16 | $Cu_{0.2}W_{0.8}O_{2.5}$ | graphite | 70 |
| example 17 | $Cu_{0.2}W_{0.8}O_{2.6}$ | graphite | 78 |
| example 18 | $Cu_{0.2}W_{0.8}O_{2.8}$ | graphite | 88 |
| example 1 | $Cu_{0.2}W_{0.8}O_{3.0}$ | graphite | 91 |
| example 19 | $Cu_{0.2}W_{0.8}O_{3.2}$ | graphite | 85 |
| example 20 | $Cu_{0.2}W_{0.8}O_{3.5}$ | graphite | 70 |
| comparative example 5 | $Cu_{0.2}W_{0.8}O_{3.6}$ | graphite | 50 |

As apparent from the result, the lithium secondary batteries in the examples 1 and 16 to 20 each employing as the positive electrode active material the composite oxide of Cu and W wherein the molar ratio (Y) of oxygen atom is in the range of 2.5 to 3.5 presented the increased percentage of capacity retention and were improved in charge/discharge cycle performance as compared with the lithium secondary batteries in the comparative examples 3 to 5 each employing as the positive electrode active material the composite oxide of Cu and W wherein the molar ratio (Y) of oxygen atom O is out of the above-mentioned range. Particularly, the lithium secondary batteries in the examples 1, 18, and 19 each employing as the positive electrode active material the composite oxide of Cu and W wherein the molar ratio (Y) of oxygen atom O is in the range of 2.8 to 3.2 presented the further increased percentage of capacity retention and were remarkably improved in charge/discharge cycle performance.

Although the present examples and comparative examples cited the composite oxide of Cu and W, substantially the same results may be attained by the composite oxide of W and one element selected from the group consisting of V, Cr, Mn, Fe, Co, and Ni.

EXAMPLES 21 TO 28

In the examples 21 to 28, each lithium secondary battery was fabricated in the same manner as that in the above-mentioned example 1 except that only the calcining temperature to obtain $Cu_{0.2}W_{0.8}O_{3.0}$ as the positive electrode active material was changed in the fabrication of the positive electrode in the example 1. More specifically, the calcining temperatures were respectively set 300° C. in the example 21; 400° C. in the example 22; 600° C. in the example 23; 800° C. in the example 24; 1200° C. in the example 25; 1400° C. in the example 26; 1500° C. in the example 27; and 1600° C. in the example 28, as shown in the following Table 5.

Figure 4:
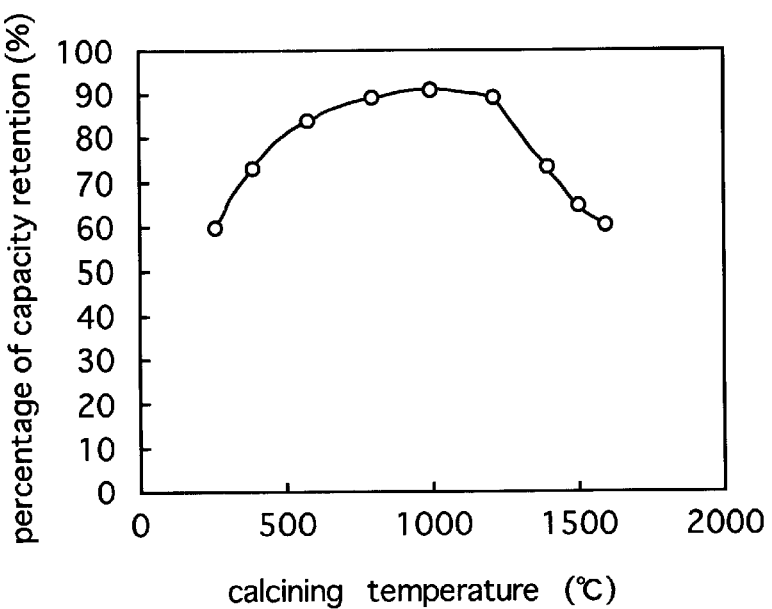
FIG. 4 is a diagram showing the relationship between calcining temperatures to obtain $Cu_{0.2}W_{0.8}O_{3.0}$ as a positive electrode active material and a percentage of capacity retention of the obtained lithium secondary battery.

With respect to each of the lithium secondary batteries according to the examples 21 to 28, the discharge capacities at the first cycle time and at the 50th cycle time were measured in the same manner as that in the above-mentioned examples 1 to 7, to find the percentage of capacity retention (%). The results, along with that of the above-mentioned example 1, are shown in the following Table 5 and FIG. 4. Further, in each of the lithium secondary batteries according to the examples 21 to 28, an average discharge voltage determined by dividing an integral value of the voltage up to the discharge cut-off voltage by the time period was also approximately 1.6 V.

TABLE 5

| | calcining temperature (° C.) | percentage of capacity retention (%) |
|---|---|---|
| example 21 | 300 | 60 |
| example 22 | 400 | 72 |
| example 23 | 600 | 83 |
| example 24 | 800 | 88 |
| example 1 | 1000 | 91 |
| example 25 | 1200 | 88 |
| example 26 | 1400 | 72 |
| example 27 | 1500 | 65 |
| example 28 | 1600 | 60 |

As apparent from the result, the lithium secondary batteries in the examples 1 and 22 to 26 each employing as the positive electrode active material $Cu_{0.2}W_{0.8}O_{3.0}$ obtained by being calcined at temperatures of 400° C. to 1400° C. presented the increased percentage of capacity retention and were improved in charge/discharge cycle performance as compared with the lithium secondary battery in the example 21 employing as the positive electrode active materials $Cu_{0.2}W_{0.8}O_{3.0}$ obtained by being calcined at a temperature of 300° C. and the lithium secondary batteries in the examples 27 and 28 each employing as the positive electrode active material $Cu_{0.2}W_{0.8}O_{3.0}$ obtained by being calcined at a temperature of not less than 1500° C. Particularly, the lithium secondary batteries in the examples 1 and 23 to 25 each employing as the positive electrode active material $Cu_{0.2}W_{0.8}O_{3.0}$ obtained by being calcined at temperatures of 600° C. to 1200° C. presented the further increased percentage of capacity retention and were remarkably improved in charge/discharge cycle performance.

EXAMPLES 29 TO 31

In the examples 29 to 31, positive electrode active materials as shown in the following Table 6 were used to fabricate positive electrodes. More specifically, there were used $LiCoO_2$ powder having an average particle diameter of 10 μm in the example 29; $LiNiO_2$ powder having an average particle diameter of 10 μm in the example 30; and $LiMn_2O_4$ powder having an average particle diameter of 10 μm in the example 31.

Then, the above-mentioned each powder as a positive electrode active material, carbon powder as a conductive agent, and polyvinylidene fluoride powder as a binding agent were mixed in a weight ratio of 85:10:5. NMP solution was further added to the resultant mixture, and the mixture was brought into a slurry. Next, the slurry was applied to one side of an aluminum foil having a thickness of 20 μm as a positive-electrode current collector by means of the doctor blade coating method. The slurry on the positive-electrode current collector was dried at 150° C. and was then punched out to obtain each disk-like positive electrode having a diameter of 17 mm and a thickness of 1.0 mm. Li was not intercalated in each of the positive electrodes thus fabricated.

On the other hand, in fabricating each negative electrode, $Cu_{0.2}W_{0.8}O_3$ powder, which was used as the positive electrode active material in the above-mentioned example 1, was used as a negative electrode active material. The $Cu_{0.2}W_{0.8}O_3$ powder, carbon powder as a conductive agent, and polyvinylidene fluoride powder as a binding agent were mixed in a weight ratio of 85:10:5. NMP solution was further added to the resultant mixture, and the mixture was brought into a slurry. Next, the slurry was applied to one side of a copper foil having a thickness of 20 μm as a negative-electrode current collector by means of the doctor blade coating method. The slurry on the positive-electrode current collector was dried at 150° C. and was then punched out to obtain a disk-like positive electrode having a diameter of 17 mm and a thickness of 1.0 mm.

Each lithium secondary battery according to the examples 29 to 31 was fabricated in the same manner as that in the above-mentioned example 1 except that the positive electrode and negative electrode fabricated in the above-mentioned manner were used.

COMPARATIVE EXAMPLE 6

In the comparative example 6, a positive electrode fabricated using $LiCoO_2$ powder having an average particle diameter of 10 μm as a positive electrode active material was used as in the case of the above-mentioned example 20 while a negative electrode fabricated using $WO_3$ as a negative electrode active material was used.

A lithium secondary battery according to the comparative example 6 was fabricated in the same manner as that in the above-mentioned example 1 except that the above-mentioned positive electrode and negative electrode were used.

COMPARATIVE EXAMPLES 7 to 9

In the comparative examples 7 to 9, the same positive electrodes as those in the above-mentioned examples 29 to 31 were respectively used. More specifically, there were used positive electrodes fabricated respectively using as positive electrode active materials $LiCoO_2$ powder having an average particle diameter of 10 μm in the comparative example 7 as in the case of the above-mentioned example 29; $LiNiO_2$ powder having an average particle diameter of 10 μm in the comparative example 8 as in the case of the above-mentioned example 30; and $LiMn_2O_4$ powder having an average particle diameter of 10 μm in the comparative example 9 as in the case of the above-mentioned example 31, as shown in the following Table 6.

Further, each of the comparative examples 7 to 9 employed as a negative electrode active material a lithium-tungsten composite oxide (Li—W composite oxide) obtained by electrochemically adding Li to $WO_3$. In electrochemically adding Li to $WO_3$, a microporous film made of polypropylene was interposed between the above-mentioned $WO_3$ and Li metal in an electrolyte solution obtained by dissolving lithium hexafluorophosphate $LiPF_6$ in a concentration of 1 mol/l in a mixed solvent containing ethylene carbonate and diethyl carbonate in the volume ratio of 1:1. In this state, the Li metal was electrolyzed with constant current of 100 μA, so that a molar ratio of Li: W would be 1.2:1.

Each lithium secondary battery according to the comparative examples 7 to 9 was fabricated in the same manner as that in the above-mentioned example 1 except that the above-mentioned positive electrode and negative electrode were used.

Next, each of the lithium secondary batteries in the examples 29 to 31 and the comparative examples 6 to 9 fabricated as above was charged with constant current of 100 μA to a charge cut-off voltage of 2.3 V and was then discharged with constant current of 100 μA to a discharge cut-off voltage of 0.7 V at a temperature of 25° C. The above-mentioned charging and discharging were considered as one cycle. 50 cycles of charging and discharging were performed to measure discharging capacities at the first cycle time and the 50th cycle time. The ratio of the discharging capacity Q50 at the 50th cycle time to the discharging capacity Q1 at the first cycle time [(Q50/Q1)×100] was found as the percentage of capacity retention (%). The results were also shown in the following Table 6. An average discharge voltage determined by dividing an integral value of the voltage up to the discharge cut-off voltage by the time period was approximately 1.1 V in each of the lithium secondary batteries according to the examples 29 to 31 and the comparative examples 6 and 7, approximately 1.0 V in the lithium secondary battery according to the comparative example 8, and approximately 1.2 V in the lithium secondary battery according to the comparative example 9.

TABLE 6

| | positive electrode active material | negative electrode active material | percentage of capacity retention (%) |
|---|---|---|---|
| example 29 | $LiCoO_2$ | $Cu_{0.2}W_{0.8}O_3$ | 97 |
| example 30 | $LiNiO_2$ | $Cu_{0.2}W_{0.8}O_3$ | 95 |
| example 31 | $LiMn_2O_4$ | $Cu_{0.2}W_{0.8}O_3$ | 98 |
| comparative example 6 | $LiCoO_2$ | $WO_3$ | 49 |
| comparative example 7 | $LiCoO_2$ | Li-W composite oxide | 53 |
| comparative example 8 | $LiNiO_2$ | Li-W composite oxide | 50 |
| comparative example 9 | $LiMn_2O_4$ | Li-W composite oxide | 54 |

As apparent from the result, the lithium secondary batteries in the examples 29 to 31 respectively employing $LiCoO_2$, $LiNiO_2$, and $LiMn_2O_4$, which are all lithium-containing transition metal oxides, as the positive electrode active materials and $Cu_{0.2}W_{0.8}O_2$ as the negative electrode active materials presented the increased percentage of capacity retention and were improved in charge/discharge cycle performance as compared with the lithium secondary batteries in the comparative examples 6 to 9 employing $WO_3$ or the Li—W composite oxide as the negative electrode active materials.

Further, when the lithium secondary batteries in the examples 29 to 31 were compared with the lithium secondary battery in the above-mentioned example 1 employing the same $Cu_{0.2}W_{0.8}O_3$ as the positive electrode active material, it was found that the lithium secondary batteries in the examples 29 to 31 each employing $Cu_{0.2}W_{0.8}O_3$ as the negative electrode active material presented the further increased percentage of capacity retention. The reason for this is conceivably that each of the lithium secondary batteries in the examples 29 to 31 employing $Cu_{0.2}W_{0.8}O_3$ as the negative electrode active material presented the lower average discharge voltage than that of the lithium secondary battery in the example 1 employing $Cu_{0.2}W_{0.8}O_3$ as the positive electrode active material, whereby the non-aqueous electrolyte solution is prevented from being decomposed.

Although the present invention has been fully described by way of examples, it is to be noted that various changes and modifications will be apparent to those skilled in the art.

Therefore, unless otherwise such changes and modifications depart from the scope of the present invention, they should be construed as being included therein.

What is claimed is:

1. A lithium secondary battery provided with a positive electrode, a negative electrode, and a non-aqueous electrolyte, wherein
a composite oxide having a monoclinic crystal structure is used as a positive electrode active material for said positive electrode or a negative electrode active material for said negative electrode, said composite oxide being represented by a chemical formula $M_XW_{1-X}O_Y$ (wherein M denotes at least one type of metal element selected from the group consisting of Cu, V, Cr, Mn, Fe, Co, and Ni; and the conditions of $0<X<0.46$ and $2.5 \leq Y \leq 3.5$ are satisfied).

2. The lithium secondary battery according to claim 1, wherein
said composite oxide is used as said positive electrode active material while a carbon material or the carbon material to which lithium is added is used as said negative electrode active material.

3. The lithium secondary battery according to claim 1, wherein
said composite oxide is used as said negative electrode active material while a lithium-containing transition metal oxide is used as said positive electrode active material.

4. The lithium secondary battery according to claim 1, wherein
said composite oxide is obtained by being calcined at temperatures of not less than 400° C. and not more than 1400° C.

5. The lithium secondary battery according to claim 1, wherein
said composite oxide is obtained by being calcined at temperatures of not less than 600° C. and not more than 1200° C.

6. The lithium secondary battery according to claim 1, wherein the conditions of $0.02 \leq X \leq 0.45$ and $2.5 \leq Y \leq 3.5$ are satisfied.

7. The lithium secondary battery according to claim 6, wherein
said composite oxide is used as said positive electrode active material while a carbon material or the carbon material to which lithium is added is used as said negative electrode active material.

8. The lithium secondary battery according to claim 6, wherein
said composite oxide is used as said negative electrode active material while a lithium-containing transition metal oxide is used as said positive electrode active material.

9. The lithium secondary battery according to claim 6, wherein
said composite oxide is obtained by being calcined at temperatures of not less than 400° C. and not more than 1400° C.

10. The lithium secondary battery according to claim 6, wherein
said composite oxide is obtained by being calcined at temperatures of not less than 600° C. and not more than 1200° C.

11. The lithium secondary battery according to claim 1, wherein
said non-aqueous electrolyte is a non-aqueous electrolyte solution obtained by dissolving a solute in an organic solvent.

12. The lithium secondary battery according to claim 11, wherein
said organic solvent in the non-aqueous electrolyte solution is at least one type of solvent selected from the group consisting of cyclic carbonic esters such as ethylene carbonate, propylene carbonate, vinylene carbonate, and butylene carbonate; chain carbonic esters such as dimethyl carbonate, diethyl carbonate, and methyl ethyl carbonate; sulfolane; tetrahydrofuran; 1,3-dioxolane; 1,2-diethoxyethane; 1,2-dimethoxyethane; and ethoxymethoxyethane.

13. The lithium secondary battery according to claim 11, wherein
said solute in the non-aqueous electrolyte solution is at least one type of solute selected from the group consisting of $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, and $LiC(C_2F_5SO_2)_3$.

14. The lithium secondary battery according to claim 1, wherein
said non-aqueous electrolyte is a polymer electrolyte comprising a polymer containing a solute.

15. The lithium secondary battery according to claim 14, wherein
said polymer in the polymer electrolyte is polyethylene oxide or polyacrylonitrile.

16. The lithium secondary battery according to claim 1, wherein
said non-aqueous electrolyte is a gelled polymer electrolyte comprising a polymer impregnated with a non-aqueous electrolyte solution.

17. The lithium secondary battery according to claim 16, wherein
an organic solvent in said non-aqueous electrolyte solution is at least one type of solvent selected from the group consisting of cyclic carbonic esters such as ethylene carbonate, propylene carbonate, vinylene carbonate, and butylene carbonate; chain carbonic esters such as dimethyl carbonate, diethyl carbonate, and methyl ethyl carbonate; sulfolane; tetrahydrofuran; 1,3-dioxolane; 1,2-diethoxyethane; 1,2-dimethoxyethane; and ethoxymethoxyethane.

18. The lithium secondary battery according to claim 16, wherein
a solute in said non-aqueous electrolyte solution is at least one type of solute selected from the group consisting of $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, and $LiC(C_2F_5SO_2)_3$.

19. The lithium secondary battery according to claim 1, wherein
said non-aqueous electrolyte is an inorganic solid electrolyte.

* * * * *